United States Patent
Oda et al.

(10) Patent No.: US 12,381,024 B2
(45) Date of Patent: Aug. 5, 2025

(54) NON-ORIENTED ELECTRICAL STEEL SHEET AND METHOD FOR MANUFACTURING THE SAME

(71) Applicant: JFE STEEL CORPORATION, Tokyo (JP)

(72) Inventors: Yoshihiko Oda, Tokyo (JP); Yoshiaki Zaizen, Tokyo (JP); Tomoyuki Okubo, Tokyo (JP); Takaaki Tanaka, Tokyo (JP); Yukino Miyamoto, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 510 days.

(21) Appl. No.: 17/755,318

(22) PCT Filed: May 13, 2020

(86) PCT No.: PCT/JP2020/019159
§ 371 (c)(1),
(2) Date: Apr. 27, 2022

(87) PCT Pub. No.: WO2021/084785
PCT Pub. Date: May 6, 2021

(65) Prior Publication Data
US 2022/0375667 A1    Nov. 24, 2022

(30) Foreign Application Priority Data
Oct. 29, 2019    (JP) ................ 2019-196428

(51) Int. Cl.
*H01F 1/16* (2006.01)
*C21C 7/06* (2006.01)
(Continued)

(52) U.S. Cl.
CPC ............ *H01F 1/16* (2013.01); *C21C 7/06* (2013.01); *C22C 38/001* (2013.01);
(Continued)

(58) Field of Classification Search
CPC ..... C22C 38/002; C22C 38/008; C22C 38/02; C22C 38/04; C22C 38/06; C22C 38/22;
(Continued)

(56) References Cited

U.S. PATENT DOCUMENTS 10,242,782 B2    3/2019    Toda et al.
11,136,645 B2    10/2021    Zaizen et al.
(Continued)

FOREIGN PATENT DOCUMENTS

CN    103827333 A    5/2014
CN    104520458 A    4/2015
(Continued)

OTHER PUBLICATIONS

Aug. 18, 2020, International Search Report issued in the International Patent Application No. PCT/JP2020/019159.
(Continued)

*Primary Examiner* — Danielle M. Carda
(74) *Attorney, Agent, or Firm* — KENJA IP LAW PC

(57) ABSTRACT

Provides is a non-oriented electrical steel sheet suitable for use in a rotor of an IPM motor that has excellent magnetic flux density $B_{50}$ and high-frequency iron loss properties, high tensile strength and fatigue strength, and little variation in tensile strength. The non-oriented electrical steel sheet has a predetermined steel sheet chemical composition and a microstructure in which a ratio of non-recrystallized microstructure is 5% or more and 70% or less and the number of inclusion having a diameter of 5 μm or more is not more than 5 counts/mm².

16 Claims, 1 Drawing Sheet

(51) Int. Cl.
*C22C 38/00* (2006.01)
*C22C 38/02* (2006.01)
*C22C 38/04* (2006.01)
*C22C 38/06* (2006.01)
*C22C 38/22* (2006.01)
*C22C 38/26* (2006.01)

(52) U.S. Cl.
CPC .......... *C22C 38/002* (2013.01); *C22C 38/008* (2013.01); *C22C 38/02* (2013.01); *C22C 38/04* (2013.01); *C22C 38/06* (2013.01); *C22C 38/22* (2013.01); *C22C 38/26* (2013.01)

(58) Field of Classification Search
CPC ....... C22C 38/26; C22C 38/20; C22C 38/004; C22C 38/12; C22C 38/16; C22C 38/34; C22C 38/60; C22C 38/38; C22C 38/14; C22C 38/001; C21D 1/26; C21D 1/76; C21D 6/005; C21D 6/008; C21D 8/1222; C21D 8/1233; C21D 8/1244; C21D 9/46; C21D 1/74; C21D 8/1272; C21D 8/1283; C21C 7/10; C21C 7/06; H01F 1/147; H01F 1/16
USPC .......................................................... 420/84
See application file for complete search history.

(56) References Cited

U.S. PATENT DOCUMENTS

| | | | |
|---|---|---|---|
| 11,162,155 | B2 | 11/2021 | Park et al. |
| 2009/0202383 | A1* | 8/2009 | Tanaka .................. C22C 38/004 |
| | | | 148/624 |
| 2013/0167987 | A1 | 7/2013 | Kim et al. |
| 2013/0306200 | A1 | 11/2013 | Kohno et al. |
| 2014/0345751 | A1 | 11/2014 | Oda et al. |
| 2015/0213928 | A1* | 7/2015 | Toda .................... C21D 8/0236 |
| | | | 148/307 |
| 2016/0020007 | A1 | 1/2016 | Oda et al. |
| 2019/0244735 | A1 | 8/2019 | Oda et al. |
| 2019/0330710 | A1 | 10/2019 | Oda et al. |
| 2020/0095659 | A1* | 3/2020 | Kim ......................... C21D 9/46 |
| 2021/0062284 | A1 | 3/2021 | Kim et al. |
| 2021/0159002 | A1 | 5/2021 | Okubo et al. |

FOREIGN PATENT DOCUMENTS

| | | | |
|---|---|---|---|
| CN | 106957994 A | 7/2017 | |
| CN | 109890994 A | 6/2019 | |
| EP | 3556882 A1 * | 10/2019 | ........... B22D 11/108 |
| JP | H11233328 A | 8/1999 | |
| JP | 2005113252 A | 4/2005 | |
| JP | 2007162062 A | 6/2007 | |
| JP | 2009299102 A | 12/2009 | |
| JP | 2010090474 A | 4/2010 | |
| JP | 2012149337 A | 8/2012 | |
| JP | 5445194 B2 | 3/2014 | |
| JP | 2018115362 A | 7/2018 | |
| JP | 2018204052 A | 12/2018 | |
| KR | 1020150057998 A | 5/2015 | |
| KR | 101628193 B1 | 6/2016 | |
| KR | 1020160078081 A | 7/2016 | |
| WO | 2014024222 A1 | 2/2014 | |
| WO | 2018117640 A1 | 6/2018 | |
| WO | WO-2018117597 A1 * | 6/2018 | ........... B22D 11/108 |
| WO | 2018179871 A1 | 10/2018 | |
| WO | 2019132128 A1 | 7/2019 | |

OTHER PUBLICATIONS

Jul. 28, 2021, Office Action issued by the Taiwan Intellectual Property Office in the corresponding Taiwanese Patent Application No. 109117692 with English language Search Report.

Mar. 17, 2021, Office Action issued by the Taiwan Intellectual Property Office in the corresponding Taiwanese Patent Application No. 109117692 with English language Search Report.

Jun. 29, 2022, the Extended European Search Report issued by the European Patent Office in the corresponding European Patent Application No. 20881606.6.

Oct. 27, 2023, Office Action issued by the China National Intellectual Property Administration in the corresponding Chinese Patent Application No. 202080072963.6 with English language concise statement of relevance.

Dec. 22, 2022, Office Action issued by the China National Intellectual Property Administration in the corresponding Chinese Patent Application No. 202080072963.6 with English language search report.

Feb. 21, 2024, Office Action issued by the Korean Intellectual Property Office in the corresponding Korean Patent Application No. 10-2022-7010998 with English language concise statement of relevance.

May 25, 2023, Office Action issued by the China National Intellectual Property Administration in the corresponding Chinese Patent Application No. 202080072963.6 with English language concise statement of relevance.

Aug. 19, 2022, Office Action issued by the China National Intellectual Property Administration in the corresponding Chinese Patent Application No. 202080072963.6 with English language search report.

* cited by examiner

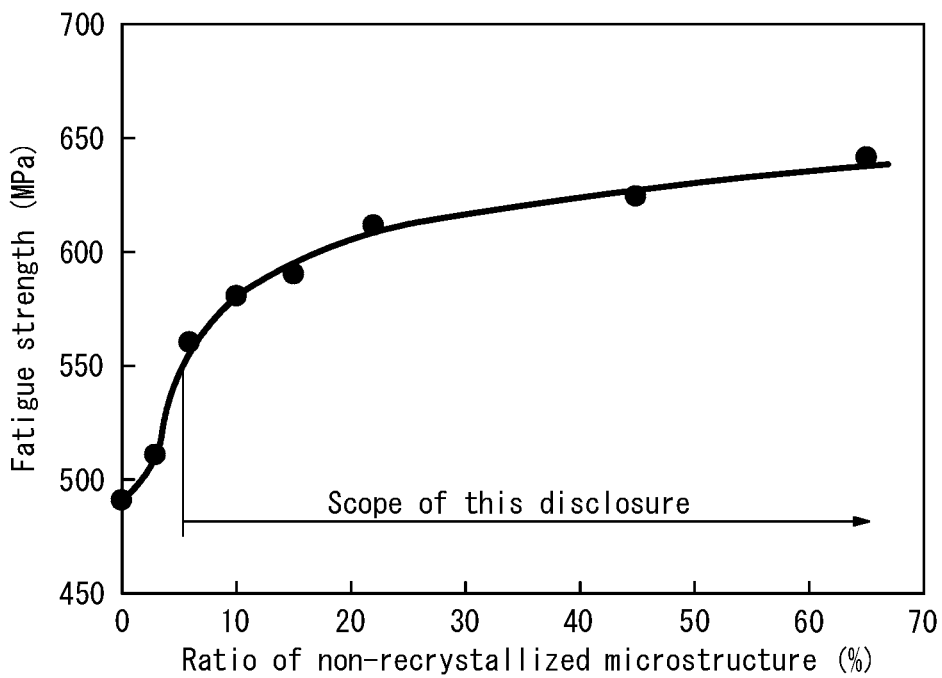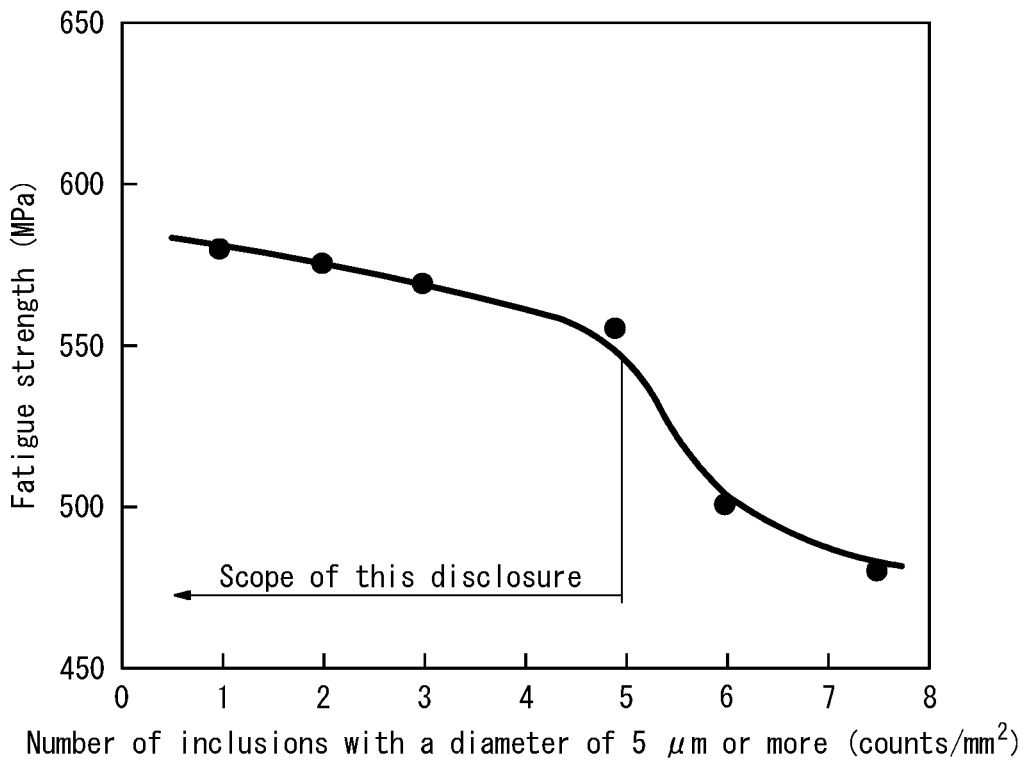

ically, the non-orient steel sheet containing steel, for enabling

NON-ORIENTED ELECTRICAL STEEL SHEET AND METHOD FOR MANUFACTURING THE SAME

TECHNICAL FIELD

The present disclosure relates to a non-oriented electrical steel sheet with controlled chemical composition and steel sheet microstructure, the non-oriented electrical steel sheet having excellent high-frequency iron loss properties and high fatigue strength. The present disclosure also relates to a method for manufacturing the non-oriented electrical steel sheet.

BACKGROUND

A motor for electric vehicles and air conditioners that makes much of energy saving usually uses an interior permanent magnet type motor (IPM motor). A rotor for the IPM motor has a slot part that is formed in an electrical steel sheet and embedded with a permanent magnet. When the rotor rotates at high speed, a centrifugal force exerts a large amount of stress on a bridge section of the slot part that supports the permanent magnet, resulting in breakage of the bridge section.

From the viewpoint of improving the strength of the bridge section, the width of the bridge should be made wider, but when the width of the bridge is made wider, the leakage flux of the permanent magnet increases to thereby decrease the motor efficiency.

Thus, the bridge width is designed to be as narrow as possible within the range where rotor strength can be achieved.

In addition, in a motor for an electric vehicle, the bridge section of the rotor is subjected to repeated loads in response to starting, accelerating, and stopping the vehicle.

Therefore, the bridge section needs to have strength that can withstand the centrifugal force at a high-speed rotation and copes with the repeated loads.

Accordingly, the non-oriented electrical steel sheet used as a material for the rotor needs to have strength that can withstand the centrifugal force at a high-speed rotation, i.e., excellent tensile strength and strength that copes with repeated loads, i.e., excellent fatigue strength.

Furthermore, in a motor using a permanent magnet, the teeth section is excited to 1.50 T or more by magnet flux, so that the magnetic flux density $B_{50}$ must be 1.50 T or more. Moreover, since iron loss due to higher harmonic waves is caused on the surface of the rotor, the electrical steel sheet used for the rotor needs to be low in high-frequency iron loss.

As a material for such a rotor, for example, JP 5445194 B (PTL 1) discloses a high-strength electrical steel sheet having a chemical composition containing Si: 0.2% or more and 3.5% or less, Al: 2.50% or less, and Nb: 0.05% or more and 8.0% or less.

JP 2005-113252 A (PTL 2) discloses a high-strength electrical steel sheet having a chemical composition containing Si: 2.0% or more and 3.5% or less, Al: 0.02% or more and 3.0% or less, and N: 0.005% or more and 0.020% or less, and an average grain size of 10 μm or less in a region of up to 10 μm in a depth from a surface of the product sheet.

CITATION LIST

Patent Literature

PTL 1: JP 5445194 B
PTL 2: JP 2005-113252 A

SUMMARY

Technical Problem

However, the electrical steel sheet disclosed in PTL 1 uses strengthening by precipitation of Nb, which improves strength but increases iron loss.

The electrical steel sheet disclosed in PTL 2 has high nitrogen content, which also increases iron loss.

Moreover, for improving the tensile strength and fatigue strength of the electrical steel sheet, it is known to be effective to reduce impurity elements such as C, S, and N while making crystal grains refined.

However, in this method, since the crystal grain size changes depending on the slight variation of the amounts of C, S and N, the variation in tensile strength among manufactured electrical steel sheets becomes large and must be suppressed.

It could thus be helpful to provide a non-oriented electrical steel sheet suitable for use in a rotor of an IPM motor that has excellent magnetic flux density $B_{50}$ and high-frequency iron loss properties, high tensile strength and fatigue strength, and little variation in tensile strength, together with a method for manufacturing the same.

Solution to Problem

As a result of intensive studies made to solve the problems stated above, we have found that by appropriately controlling the amount of Zn and Mo added to a non-oriented electrical steel sheet having a non-recrystallized microstructure and reducing inclusions in the steel, it is possible to make magnetic flux density $B_{50}$ and high-frequency iron loss properties excellent, and fatigue strength and tensile strength high, and reduce the variation in tensile strength.

The present disclosure was completed based on the aforementioned discoveries, and the primary features thereof are as described below.

1. A non-oriented electrical steel sheet comprising: a steel sheet chemical composition containing (consisting of), in mass %, C: 0% or more and 0.0100% or less, P: 0% or more and 0.100% or less, Si: 2.00% or more and 5.00% or less, Mn: 0% or more and 5.00% or less, Al: 0% or more and 3.00% or less, S: 0% or more and 0.0100% or less, N: 0% or more and 0.0050% or less, Zn: 0.0005% or more and 0.0030% or less, Mo: 0.001% or more and 0.100% or less, Cu: 0% or more and 0.2% or less, Nb: 0% or more and 0.010% or less, and O: 0% or more and 0.0050% or less, with the balance being Fe and inevitable impurities; and a microstructure in which a ratio of non-recrystallized microstructure is 5% or more and 70% or less, and the number of inclusion with a diameter of 5 μm or more is not more than 5 counts/mm².

2. The non-oriented electrical steel sheet according to 1., further comprising Cr: 0.010 mass % or more and 5.000 mass % or less as the steel sheet chemical composition.

3. The non-oriented electrical steel sheet according to 1. or 2., further comprising Ca: 0.0010 mass % or more and 0.0050 mass % or less as the steel sheet chemical composition.

4. The non-oriented electrical steel sheet according to any one of 1. to 3., further comprising Sn: 0.001 mass % or more and 0.100 mass % or less and/or Sb: 0.0010 mass % or more and 0.1000 mass % or less as the steel sheet chemical composition.

5. A method for manufacturing the non-oriented electrical steel sheet according to any one of 1. to 4., comprising feeding a deoxidizer during vacuum degassing and then perform stirring for 10 minutes or more.

Advantageous Effect

According to the present disclosure, a rotor material for high speed motors having not only excellent magnetic flux density $B_{50}$ and high-frequency iron loss properties but also high fatigue strength and low variation in high tensile strength.

BRIEF DESCRIPTION OF THE DRAWINGS

In the accompanying drawings:

FIG. 1 illustrates the relationship between the ratio of non-recrystallized microstructure and the fatigue strength; and FIG. 2 illustrates the relationship between the number of inclusions with a diameter of 5 μm or more and the fatigue strength.

DETAILED DESCRIPTION

Hereinafter, the history of how the present disclosure has been achieved, and the details and the reasons for the limitations of the present disclosure will be described.

Some non-oriented electrical steel sheets have a non-recrystallized microstructure. The non-recrystallized microstructure in the non-oriented electrical steel sheet is a microstructure in which recrystallization has not been completed. Recrystallization means that crystal grains with significantly lower dislocation density are formed and grow when a material is held at high temperatures, and recrystallized grains can be distinguished from non-crystallized grains by observation with an optical microscopy. When the ratio of the non-recrystallized microstructure in steel is large, the fatigue strength increases while the iron loss tends to deteriorate.

First, in order to investigate the effect of the non-recrystallized microstructure on the fatigue strength, we melted steel having, in mass %, C: 0.0015%, Si: 3.7%, Al: 0.5%, Mn: 0.7%, P: 0.01%, S: 0.001%, N: 0.0016%, Zn: 0.0012%, and O: 0.0015% (hereafter, % for steel components denotes mass %) in the laboratory, and subjected it to hot rolling to obtain hot rolled sheets with a thickness of 1.6 mm. The hot rolled sheets were subjected to hot-rolled sheet annealing at 950° C. for 30 s in a 100 vol % $N_2$ atmosphere, followed by acid cleaning, cold rolling to reach a sheet thickness of 0.25 mm, and then final annealing at 550° C. or higher and 800° C. or lower for 10 s in a 20 vol % $H_2$-80 vol % $N_2$ atmosphere to obtain final annealed sheets.

A fatigue test piece having a parallel portion with a width of 5 mm and a length of 150 mm was taken out from each final annealed sheet in a rolling direction and a transverse direction (direction orthogonal to the rolling direction). The parallel portion was mirror-finished, and further polished with an emery paper No. 800 along with a longitudinal direction. A fatigue test was conducted with a tensile-tensile stress ratio of 0.1 and a frequency of 20 Hz, and the stress amplitude at which no fracture occurred after repetitions of $10^7$ times was determined as a fatigue strength of the final annealed sheet.

The condition of "mirror-finished" can be obtained by polishing a surface with a diamond grindstone No. 500.

FIG. 1 illustrates the effect of the non-recrystallized microstructure on the fatigue strength of the steel sheet. Here, the fatigue strength in the present disclosure indicates the average value of fatigue strength in the rolling direction and that in the transverse direction (direction orthogonal to the rolling direction). For the microstructure observation, a cross section in the rolling direction of each steel sheet was polished, etched with nitar, and then observed with an optical microscopy. 1 m² of the steel sheet was randomly sampled at five locations to determine the ratio of non-recrystallized grains in a measured region of 1 cm² per location. The ratio of non-recrystallized grains in the present disclosure is the ratio, or area ratio, in the overall microstructure, and such ratio is the result of using this measurement technique.

As can be seen from FIG. 1, when the ratio of non-recrystallized microstructure in the steel microstructure is 5% or more, fatigue strength of 550 MPa or more, which is required for a material for the high-speed rotor of the HEV/EV motor (IPM motor), can be obtained. This is considered to be because the non-recrystallized microstructure has more dislocations, which causes dislocation pile-ups and higher fatigue strength.

From the above results, it can be seen that the fatigue strength of the steel sheet becomes high when the ratio of non-recrystallized microstructure is 5% or more, preferably 15% or more. This is because the fatigue strength and tensile strength improve as the ratio of non-recrystallized microstructure increases. On the other hand, if the ratio of non-recrystallized microstructure in the steel microstructure exceeds 70%, the iron loss becomes remarkably high. Therefore, the ratio of non-recrystallized microstructure should be 70% or less, preferably 60% or less.

Next, in order to investigate the manufacturing stability, focusing on the variation of inclusions, we melted steel containing C: 0.0018%, Si: 3.5%, Al: 0.65%, Mn: 0.4%, P: 0.01%, S: 0.0008%, N: 0.0016% and Zn: 0.0011% for 10 charges in the laboratory and subjected it to hot rolling to reach a sheet thickness of 2 mm to produce hot rolled sheets. The hot rolled sheets were subjected to hot-rolled sheet annealing at 1000° C. for 30 s in a 100 vol % $N_2$ atmosphere, followed by acid cleaning, cold rolling to reach a sheet thickness of 0.25 mm, and then final annealing at 650° C. for 10 s in a 20 vol % $H_2$-80 vol % $N_2$ atmosphere.

When the fatigue resistance of the steel sheets thus obtained was evaluated, some materials were found to have significantly low fatigue strength.

In order to investigate the cause of the problem, after polishing a surface of each steel sheet with alumina, and etching it with nital, observation with a scanning electron microscope (SEM) was conducted and coarse inclusions were found. These coarse inclusions were considered to be origins of cracks in the steel sheet when fatigue strength was measured, resulting in a significant decrease in fatigue strength. The inclusions inhibit crystal grain growth of the non-oriented electrical steel sheet. As the inclusions, for example, sulfide such as copper sulfide (CuS) and manganese sulfide (MnS), oxides such as silica ($SiO_2$) and alumina ($Al_2O_3$), and nitrides such as aluminum nitride (AlN) and titanium nitride (TiN) are known. In the present disclosure, inclusions shall mean these non-metallic precipitates such as oxides, sulfides, and nitrides.

In order to investigate the effect of the number of inclusions on fatigue strength, the steel sheet surface was polished to a depth of 50 μm and to the center part in the sheet thickness direction from the surface, and the numbers of inclusions were investigated and the average value was calculated. FIG. 2 illustrates the effect of the number of inclusions on fatigue strength. Here, the size and number of the inclusions were evaluated as follows. For the size of the inclusions, the equivalent circular diameter of each inclusion was determined. For the number of the inclusions, 1 m$^2$ of each steel sheet was randomly sampled at twenty locations, and the number of inclusions was counted in an observation field of view of 0.1 mm$^2$ per sampling location and multiplied by 10 to obtain the number of inclusions in 1 mm$^2$ of the steel sheet. As the inclusions, those with a diameter of 5 μm or more, which affect the fatigue strength, were counted. The number of inclusions in the present disclosure is the average of the number of inclusions in the entire microstructure, and such a number is the result obtained by using this measurement technique.

As can be seen from FIG. 2, the fatigue strength decreases significantly when the number of inclusions with a diameter of 5 μm or more exceeds 5/mm$^2$. In conventional electrical steel sheets, fatigue strength is not so much affected by inclusions, but in high-strength electrical steel sheets, fatigue strength is thought to decrease with the occurrence of cracks caused by inclusions, and thus it is necessary to reduce the amount of coarse inclusions. Inclusions with a diameter of less than 5 μm are considered to have little effect because they do not act as a crack initiating factor.

In view of the above, it can be seen that the number of inclusions with a diameter of 5 μm or more must be 5/mm$^2$ or less in order to stably maintain fatigue strength of 550 MPa or more.

The oxygen concentration of the materials used in the tests to obtain the results illustrated in FIG. 2 was measured to be 10 ppm or more and 100 ppm or less. In general, it is known that the amount of inclusions in steel is reduced by reducing the oxygen content. However, in the above tests, the number of inclusions with a diameter of 5 μm or more was not necessarily correlated with the oxygen content. Therefore, it is found that merely limiting the oxygen content is insufficient to suppress the variation in fatigue strength, and that it is important to control the inclusion.

In the present disclosure, the components of the steel sheet (hereinafter, % for the components of the steel sheet refers to mass %) shall be in the following range.

Si: 2.00% or More and 5.00% or Less

Si is an effective element for increasing the specific resistance of the steel sheet. Thus, the lower limit of the Si content is 2.00% and the Si content is preferably 3.50% or more. On the other hand, Si content exceeding 5.00% results in a decrease in saturation magnetic flux density and an associated decrease in magnetic flux density and also deteriorates fatigue strength. Thus, the upper limit of the Si content is 5.00%.

Al: 3.00% or Less

Al, like Si, is an effective element for increasing specific resistance. However, Al content exceeding 3.00% results in a decrease in saturation magnetic flux density and an associated decrease in magnetic flux density and also deteriorates fatigue strength. Thus, the upper limit of the Al content is 3.00%. No lower limit is not particularly placed on the Al content, but the Al content is preferably 0.30% or more, and more preferably 0.50% or more from the viewpoint of iron loss.

C: 0.0100% or Less

C increases iron loss through carbide precipitation. Therefore, the C content is set to 0.0100% or less, preferably 0.0050% or less in order to suppress the increase in iron loss. The lower limit is not particularly limited and may be 0%.

Mn: 5.00% or Less

Mn is an effective element for increasing specific resistance of the steel sheet. However, Mn content exceeding 5.00% reduces the magnetic flux density, and thus the upper limit of Mn is 5.00%. No lower limit is not particularly placed on the Mn content, but the Mn content is preferably 0.10% or more in order to decrease iron loss.

P: 0.100% or Less

P makes the steel sheet brittle if added beyond 0.100%, which makes cold rolling difficult. Thus, the P content is set to 0.200% or less. The lower limit is not particularly limited and may be 0%.

N: 0.0050% or Less

N causes more nitride precipitation if added in a large amount and increases iron loss. Thus, the N content is set to 0.0050% or less. The lower limit is not particularly limited and may be 0%.

O: 0.0050% or Less

O content exceeding 0.0050% forms oxides and degrades the magnetic properties. Thus, the upper limit for the O content is 0.0050%. The lower limit is not particularly limited and may be 0%.

S: 0.0100% or Less

S causes an increase in iron loss due to precipitation of MnS if added beyond 0.0100%. Thus, the upper limit for the S content is 0.0100%. The lower limit is not particularly limited and may be 0%.

Mo: 0.001% or More and 0.100% or Less

Mo stabilizes the non-recrystallized microstructure and thus the lower limit for the Mo content is 0.001%. On the other hand, Mo content exceeding 0.100% significantly increases iron loss. Thus, the upper limit for the Mo content is 0.100%, preferably 0.010%.

Cu: 0.2% or Less

Cu content exceeding 0.2% results in a decrease in magnetic flux density. Thus, the upper limit of Cu content is 0.2%, and more preferably 0.1%. The lower limit is not particularly limited and may be 0%.

Nb: 0.010% or Less

Nb is an element that forms precipitates such as NbC and contributes to increasing strength, but the formation of precipitates significantly increases iron loss. Thus, the upper limit for Nb content is 0.010% and preferably 0.005% or less. The lower limit is not limited, but it should be 0.001% or more for enhancing strength.

Zn: 0.0005% or More and 0.0030% or Less

Zn is an element that is usually not mixed in an electrical steel sheet because of its high vapor pressure and easy volatility. However, if the temperature of molten steel is adjusted after deoxidation by adding scrap, Zn may be mixed into the steel. For general electrical steel sheets, materials that have been sufficiently recrystallized are shipped as products, so strength properties are stable even if Zn is mixed in. However, in the material where the non-recrystallized microstructure remains as in the present disclosure, mixed Zn causes variation in strength.

Here, in order to investigate the effect of Zn on the variation in strength of the steel sheet, steel having a chemical composition containing C: 0.0021%, Si: 3.7%, Al:

0.6%, Mn: 0.8%, P: 0.01%, S: 0.001%, N: 0.0013%, and Zn: 0.0003% or more and 0.0060% and less and O: 0.0015%, with the balance being Fe and inevitable impurities, was melted in the laboratory, and hot rolled to obtain hot rolled steel sheets having a sheet thickness of 2 mm. The hot rolled steel sheets were then subjected to hot-rolled sheet annealing at 1000° C. for 30 s in a 100 vol % $N_2$ atmosphere, followed by acid cleaning, cold rolling to reach a sheet thickness of 0.25 mm, and then final annealing at 680° C. for 10 s in a 20 vol % $H_2$-80 vol % $N_2$ atmosphere. Twenty JIS No. 5 test pieces were taken from each steel sheet after the final annealing and subjected to tensile tests. From the results of the tensile tests, the standard deviation σ was determined and the relationship between the Zn content and σ was plotted. When the Zn content exceeded 0.0030%, σ increased to 20 MPa or more and the variation became large. This is considered to be because Zn was mixed in to make the recrystallization behavior unstable, resulting in variation in recrystallization ratio among the twenty test pieces.

For this reason, the upper limit of Zn content is 0.0030%. As a result, the standard deviation σ can be suppressed to 20 MPa or less in the electrical steel sheet in which the non-recrystallized microstructure remains. Although the lower limit of Zn content is preferably as low as possible, stabilizing the Zn content to 0.0005% or less increases cost and thus the lower limit of Zn content is 0.0005%.

The balance other than the steel sheet components of the present disclosure includes Fe and inevitable impurities.

In addition to the above steel sheet components, the following components may be included as appropriate in the present disclosure.

Cr: 0.010% or More and 5.000% or Less

Cr, like Si, is an effective element for increasing specific resistance. Therefore, when Cr is added, the lower limit is 0.010%. Desirably, the lower limit is 0.100%. On the other hand, Cr content exceeding 5.000% results in a decrease in saturation magnetic flux density and an associated decrease in magnetic flux density. Thus, the upper limit for the Cr content is 5.000%.

Ca: 0.0010% or More and 0.0050% or Less.

Ca is an element that fixes S as CaS and contributes to iron loss reduction. Therefore, when Ca is added, the lower limit is 0.0010%. On the other hand, since Ca content exceeding 0.0050% causes saturation of the effect and unnecessarily increases cost, the upper limit is 0.0050%.

Sn: 0.001% or More and 0.100% or Less and/or Sb: 0.0010% or More and 0.1000% or Less.

Sn is an effective element for improving magnetic flux density through texture improvement. Therefore, when Sn is added, the lower limit is 0.001%. On the other hand, Sn content exceeding 0.100% makes the material brittle, so the upper limit of Sn content is 0.100%. Sb is also an effective element for improving magnetic flux density through texture improvement. Therefore, when Sb is added, the lower limit is 0.0010%. On the other hand, Sb content exceeding 0.1000% makes the material brittle, so the upper limit of Sb content is 0.1000%.

Here, when the rotor is over-rotated, the bridge section is subjected to excessive stress and may be instantly broken. In order to prevent this instantaneous breakage, the material must have sufficiently high tensile strength. Specifically, tensile stress of 700 MPa or more is required for HEV/EV motors driven at high speeds. Tensile strength of 700 MPa or more can be stably obtained by satisfying the present disclosure.

In addition, it is effective to reduce iron loss to improve the motor efficiency at high-speed rotation, and by satisfying the present disclosure, an excellent property of the iron loss at high frequency, or $W_{5/3K}$, of 120.0 W/Kg or less can be provided.

Furthermore, in an interior permanent magnet type motor, iron loss tends to increase as the current increases, and a higher magnetic flux density is required to avoid this. By satisfying the present disclosure, a high magnetic flux density of 1.50 T or more for $B_{50}$ can be obtained.

A method for manufacturing the steel sheet of the present disclosure will now be described.

In the present disclosure, the components constituting the steel sheet must be within the scope of the present disclosure, and the manufacturing method must be further restricted as follows.

In the present disclosure, molten steel is subjected to blowing in a converter, followed by degassing (secondary refining), casting, and hot rolling. The degassing (vacuum degassing), or secondary refining, is carried out using Ruhrstahl-Heraeus (RH) or Dortmund-Horde (DH). At that time, in order to sufficiently separate and float inclusions, deoxidation elements (deoxidizer) such as Al are fed in and the steel is stirred for 10 minutes or more (also referred to as RH reflux time or DH reflux time in the present disclosure). In order to prevent Zn mixing from scrap or alloy iron, it is desirable to perform stirring for at least 5 minutes after feeding the scrap or alloy iron to evaporate Zn.

The final annealing temperature and coiling temperature during the hot rolling are not particularly specified. Hot-rolled sheet annealing may or may not be performed after the hot rolling. Then, cold rolling is performed once, or twice or more with intermediate annealing performed therebetween, to reach a predetermined sheet thickness, and finish annealing is further performed to obtain a non-oriented electrical steel sheet according to the present disclosure. The final annealing after the cold rolling should be performed at 620° C. or higher and 720° C. or lower in order to properly retain non-recrystallized grains in the steel sheet microstructure, which is a feature of the present disclosure.

EXAMPLES

Molten steel is subjected to blowing in a converter, followed by vacuum degassing treatment. A deoxidizer was fed in during the degassing and then the steel was stirred for the times (RH reflux time) listed in Table 2 and Table 4, and then cast so as to have the steel components listed in Table 1 and Table 3. The term "tr." in the tables means that a corresponding element is contained but in extremely small amounts (not zero).

After the above casting, slab heating under the condition of 1140° C.×1 h was performed and hot rolling was performed. The hot-rolling finish temperature was 800° C. and the coiling temperature was 610° C. After the coiling, hot-rolled sheet annealing was performed under 100 vol % $N_2$ atmosphere conditions. Then, cold rolling was performed to reach a sheet thickness of 0.30 mm, and then final annealing was conducted in an atmosphere of 20 vol % $H_2$-80 vol % $N_2$ and at the final annealing temperatures listed in Tables 2 and 4 to obtain final annealed sheets.

Magnetic property measurement was carried out in accordance with Epstein measurement on Epstein samples cut out from the final annealed sheets in the rolling direction and the transverse direction (direction orthogonal to the rolling direction).

The fatigue test was conducted with a tensile-tensile stress ratio of 0.1 and a frequency of 20 Hz, and the stress amplitude at which no fracture was caused after repetitions of $10^7$ times was determined as a fatigue strength. The fatigue test piece having a parallel portion with a width of 5 mm and a length of 150 mm was taken out from each final annealed sheet in a rolling direction and a transverse direction (direction orthogonal to the rolling direction). The parallel portion was mirror-finished, and further polished with an emery paper No. 800 along with a longitudinal direction.

Tensile tests were carried out in accordance with JIS Z 2241 by using JIS No. 5 test pieces with the longitudinal direction thereof being rolling direction. Further, in order to investigate the variation (σ) of tensile strength (TS), twenty JIS No. 5 test pieces were collected and subjected to tensile tests to obtain the standard deviation σ.

Moreover, for the magnetic flux density, the magnetic flux density $B_{50}$ at a magnetic field strength of 5000 A/m was measured. For the iron loss, the iron loss $W_{5/3K}$ when each steel sheet was excited at a frequency of 3 kHz and a magnetic flux density of 0.5 T was measured.

The test results are listed in Table 2 and Table 4.

As can be seen from Table 2 and Table 4, the steel sheets that meet the conditions of the present disclosure all have excellent properties of a fatigue strength of 550 MPa or more, a tensile strength of 700 MPa or more, the standard deviation σ of tensile strength of 20 MPa or less, a magnetic flux density $B_{50}$ of 1.5 T or more, and an iron loss $W_{5/3K}$ of 120 W/kg or less.

TABLE 1

| | Steel components (mass %) | | | | | | | | | | | | | |
|---|---|---|---|---|---|---|---|---|---|---|---|---|---|---|
| No. | C | Si | Mn | P | S | Al | Mo | Sb | Sn | Zn | Cr | Nb | Ca | N | O |
| 1 | 0.0018 | 3.80 | 0.60 | 0.010 | 0.0015 | 0.60 | 0.002 | tr. | 0.030 | 0.0020 | tr. | 0.001 | tr. | 0.0015 | 0.0015 |
| 2 | 0.0018 | 3.80 | 0.60 | 0.010 | 0.0015 | 0.60 | 0.002 | tr. | 0.030 | 0.0020 | tr. | 0.001 | tr. | 0.0015 | 0.0016 |
| 3 | 0.0018 | 3.80 | 0.60 | 0.010 | 0.0015 | 0.60 | 0.002 | tr. | 0.030 | 0.0020 | tr. | 0.001 | tr. | 0.0015 | 0.0018 |
| 4 | 0.0018 | 3.80 | 0.60 | 0.010 | 0.0015 | 0.60 | 0.002 | tr. | 0.030 | 0.0020 | tr. | 0.001 | tr. | 0.0015 | 0.0015 |
| 5 | 0.0018 | 3.80 | 0.60 | 0.010 | 0.0015 | 0.60 | 0.002 | tr. | 0.030 | 0.0020 | tr. | 0.001 | tr. | 0.0015 | 0.0016 |
| 6 | 0.0018 | 3.80 | 0.60 | 0.010 | 0.0015 | 0.60 | 0.002 | tr. | 0.030 | 0.0020 | tr. | 0.001 | tr. | 0.0015 | 0.0018 |
| 7 | 0.0018 | 3.80 | 0.60 | 0.010 | 0.0015 | 0.60 | 0.002 | tr. | 0.030 | 0.0020 | tr. | 0.001 | tr. | 0.0015 | 0.0020 |
| 8 | 0.0020 | 3.81 | 0.61 | 0.010 | 0.0015 | 0.61 | 0.002 | tr. | 0.032 | 0.0020 | tr. | 0.001 | tr. | 0.0016 | 0.0042 |
| 9 | 0.0021 | 3.82 | 0.59 | 0.010 | 0.0017 | 0.62 | 0.002 | tr. | 0.030 | 0.0020 | tr. | 0.001 | tr. | 0.0017 | 0.0058 |
| 10 | 0.0016 | 3.83 | 0.50 | 0.016 | 0.0012 | 0.70 | 0.002 | tr. | 0.033 | 0.0005 | tr. | 0.001 | tr. | 0.0016 | 0.0025 |
| 11 | 0.0016 | 3.84 | 0.51 | 0.008 | 0.0012 | 0.71 | 0.002 | tr. | 0.029 | 0.0011 | tr. | 0.001 | tr. | 0.0015 | 0.0023 |
| 12 | 0.0018 | 3.86 | 0.50 | 0.007 | 0.0016 | 0.72 | 0.002 | tr. | 0.031 | 0.0026 | tr. | 0.001 | tr. | 0.0014 | 0.0026 |
| 13 | 0.0012 | 3.82 | 0.50 | 0.010 | 0.0016 | 0.73 | 0.002 | tr. | 0.031 | 0.0037 | tr. | 0.001 | tr. | 0.0021 | 0.0024 |
| 14 | 0.0021 | 1.80 | 0.52 | 0.010 | 0.0009 | 1.10 | 0.002 | tr. | 0.035 | 0.0010 | tr. | 0.001 | tr. | 0.0017 | 0.0018 |
| 15 | 0.0020 | 3.21 | 1.00 | 0.005 | 0.0008 | 1.20 | 0.002 | tr. | 0.034 | 0.0010 | 0.100 | 0.001 | tr. | 0.0015 | 0.0017 |
| 16 | 0.0020 | 3.70 | 0.53 | 0.005 | 0.0008 | 0.70 | 0.002 | tr. | 0.035 | 0.0010 | 0.100 | 0.001 | tr. | 0.0016 | 0.0019 |
| 17 | 0.0021 | 4.00 | 0.56 | 0.004 | 0.0009 | 1.11 | 0.002 | tr. | 0.041 | 0.0010 | 0.100 | 0.001 | tr. | 0.0013 | 0.0015 |
| 18 | 0.0022 | 4.50 | 0.50 | 0.010 | 0.0007 | 1.12 | 0.002 | tr. | 0.036 | 0.0010 | 0.100 | 0.001 | tr. | 0.0022 | 0.0012 |
| 19 | 0.0019 | 5.50 | 0.50 | 0.010 | 0.0012 | 1.09 | 0.002 | tr. | 0.035 | 0.0010 | 0.010 | 0.001 | tr. | 0.0026 | 0.0013 |
| 20 | 0.0021 | 3.81 | 0.65 | 0.010 | 0.0008 | 0.67 | 0.002 | tr. | 0.035 | 0.0010 | 0.100 | 0.001 | tr. | 0.0015 | 0.0021 |
| 21 | 0.0042 | 3.82 | 0.65 | 0.005 | 0.0008 | 0.69 | 0.002 | tr. | 0.035 | 0.0010 | 0.100 | 0.001 | tr. | 0.0019 | 0.0022 |
| 22 | 0.0075 | 3.80 | 0.65 | 0.004 | 0.0008 | 0.69 | 0.002 | tr. | 0.035 | 0.0010 | 0.100 | 0.001 | tr. | 0.0016 | 0.0040 |
| 23 | 0.0110 | 3.80 | 0.65 | 0.004 | 0.0008 | 0.69 | 0.002 | tr. | 0.035 | 0.0010 | 0.100 | 0.001 | tr. | 0.0016 | 0.0042 |
| 24 | 0.0019 | 3.80 | 0.20 | 0.010 | 0.0021 | 0.71 | 0.002 | tr. | 0.035 | 0.0010 | 0.110 | 0.001 | tr. | 0.0015 | 0.0023 |
| 25 | 0.0018 | 3.80 | 1.60 | 0.010 | 0.0020 | 0.70 | 0.002 | tr. | 0.035 | 0.0010 | 0.120 | 0.001 | tr. | 0.0016 | 0.0020 |
| 26 | 0.0017 | 3.32 | 2.50 | 0.008 | 0.0022 | 0.50 | 0.002 | tr. | 0.035 | 0.0010 | 0.120 | 0.001 | tr. | 0.0017 | 0.0021 |
| 27 | 0.0018 | 3.20 | 5.50 | 0.010 | 0.0023 | 0.40 | 0.002 | tr. | 0.035 | 0.0010 | 0.130 | 0.003 | tr. | 0.0015 | 0.0023 |
| 28 | 0.0017 | 3.80 | 1.10 | 0.010 | 0.0007 | 0.31 | 0.002 | tr. | 0.035 | 0.0010 | 0.100 | 0.003 | tr. | 0.0015 | 0.0022 |
| 29 | 0.0018 | 3.60 | 1.20 | 0.009 | 0.0007 | 0.55 | 0.002 | tr. | 0.035 | 0.0010 | 0.100 | 0.003 | tr. | 0.0020 | 0.0023 |

TABLE 2

| No. | RH reflux time (min) | Sheet thickness (mm) | Final annealing temperature (° C.) | Ratio of non-recrystallized parts (%) | Number of inclusions with size of 5 μm or more (count/mm²) | Iron loss $W_{5/3k}$ (W/kg) | Magnetic flux density $B_{50}$ (T) | Tensile strength TS (MPa) | Variation σ (MPa) | Fatigue strength (MPa) | Remarks |
|---|---|---|---|---|---|---|---|---|---|---|---|
| 1 | 22 | 0.25 | 800 | — | 2 | 74.0 | 1.65 | 650 | 12 | 490 | Com. Ex. |
| 2 | 22 | 0.25 | 750 | — | 2 | 80.0 | 1.65 | 680 | 13 | 520 | Com. Ex. |
| 3 | 22 | 0.25 | 720 | 5 | 2 | 92.0 | 1.63 | 700 | 15 | 560 | Ex. |
| 4 | 22 | 0.25 | 680 | 15 | 2 | 105.0 | 1.60 | 840 | 15 | 600 | Ex. |
| 5 | 22 | 0.25 | 650 | 45 | 2 | 109.3 | 1.58 | 850 | 15 | 610 | Ex. |
| 6 | 22 | 0.25 | 630 | 60 | 2 | 118.0 | 1.55 | 900 | 16 | 620 | Ex. |
| 7 | 22 | 0.25 | 610 | 80 | 2 | 150.0 | 1.47 | 930 | 16 | 625 | Com. Ex. |
| 8 | 12 | 0.25 | 660 | 30 | 4 | 105.0 | 1.60 | 850 | 15 | 600 | Ex. |
| 9 | 8 | 0.25 | 660 | 30 | 7 | 129.0 | 1.60 | 820 | 22 | 530 | Com. Ex. |
| 10 | 16 | 0.25 | 660 | 32 | 3 | 104.0 | 1.60 | 850 | 15 | 595 | Ex. |
| 11 | 16 | 0.25 | 660 | 31 | 3 | 105.0 | 1.60 | 850 | 15 | 595 | Ex. |
| 12 | 16 | 0.25 | 660 | 29 | 3 | 105.4 | 1.60 | 851 | 16 | 596 | Ex. |
| 13 | 16 | 0.25 | 660 | 30 | 3 | 105.0 | 1.60 | 845 | 21 | 592 | Com. Ex. |
| 14 | 20 | 0.25 | 660 | 30 | 2 | 136.0 | 1.71 | 675 | 16 | 486 | Com. Ex. |
| 15 | 20 | 0.25 | 660 | 30 | 2 | 106.0 | 1.62 | 828 | 16 | 579 | Ex. |
| 16 | 20 | 0.25 | 660 | 30 | 2 | 103.5 | 1.60 | 849 | 15 | 594 | Ex. |

TABLE 2-continued

| No. | RH reflux time (min) | Sheet thickness (mm) | Final annealing temperature (° C.) | Ratio of non-recrystallized parts (%) | Number of inclusions with size of 5 μm or more (count/mm²) | Iron loss $W_{5/3k}$ (W/kg) | Magnetic flux density $B_{50}$ (T) | Tensile strength TS (MPa) | Variation σ (MPa) | Fatigue strength (MPa) | Remarks |
|---|---|---|---|---|---|---|---|---|---|---|---|
| 17 | 20 | 0.25 | 660 | 30 | 2 | 102.3 | 1.58 | 897 | 16 | 628 | Ex. |
| 18 | 20 | 0.25 | 660 | 29 | 2 | 100.8 | 1.56 | 947 | 15 | 620 | Ex. |
| 19 | 20 | 0.25 | 660 | 31 | 2 | 92.3 | 1.48 | 850 | 17 | 480 | Com. Ex. |
| 20 | 15 | 0.25 | 660 | 32 | 3 | 105.0 | 1.60 | 860 | 15 | 602 | Ex. |
| 21 | 15 | 0.25 | 660 | 32 | 3 | 106.0 | 1.60 | 862 | 15 | 604 | Ex. |
| 22 | 12 | 0.25 | 660 | 32 | 4 | 108.0 | 1.59 | 860 | 16 | 602 | Ex. |
| 23 | 11 | 0.25 | 660 | 32 | 4 | 125.0 | 1.59 | 860 | 16 | 602 | Com. Ex. |
| 24 | 15 | 0.25 | 660 | 32 | 3 | 105.0 | 1.61 | 856 | 15 | 599 | Ex. |
| 25 | 15 | 0.25 | 660 | 30 | 3 | 103.2 | 1.59 | 873 | 14 | 611 | Ex. |
| 26 | 15 | 0.25 | 680 | 32 | 3 | 101.5 | 1.55 | 829 | 15 | 580 | Ex. |
| 27 | 15 | 0.25 | 710 | 31 | 3 | 94.2 | 1.42 | 851 | 15 | 596 | Com. Ex. |
| 28 | 15 | 0.25 | 660 | 30 | 3 | 106.4 | 1.62 | 850 | 15 | 612 | Ex. |
| 29 | 15 | 0.25 | 660 | 31 | 3 | 105.0 | 1.60 | 841 | 15 | 589 | Ex. |

TABLE 3

| | Steel components (mass %) | | | | | | | | | | | | | | | |
|---|---|---|---|---|---|---|---|---|---|---|---|---|---|---|---|---|
| No. | C | Si | Mn | P | S | Al | Mo | Sb | Sn | Zn | Cr | CU | Nb | Ca | N | O |
| 30 | 0.0021 | 3.30 | 0.65 | 0.010 | 0.0007 | 1.50 | 0.002 | tr. | 0.035 | 0.0010 | 0.120 | tr. | 0.003 | tr. | 0.0014 | 0.0022 |
| 31 | 0.0019 | 3.20 | 0.65 | 0.010 | 0.0006 | 3.50 | 0.002 | tr. | 0.035 | 0.0010 | 0.110 | tr. | 0.003 | tr. | 0.0014 | 0.0020 |
| 32 | 0.0015 | 3.50 | 0.80 | 0.010 | 0.0008 | 1.20 | 0.002 | tr. | 0.035 | 0.0010 | 0.100 | tr. | 0.003 | tr. | 0.0014 | 0.0021 |
| 33 | 0.0020 | 3.81 | 0.65 | 0.150 | 0.0008 | 0.70 | 0.002 | tr. | 0.035 | 0.0010 | 0.130 | tr. | 0.001 | tr. | 0.0015 | 0.0020 |
| 34 | 0.0016 | 3.80 | 0.65 | 0.010 | 0.0050 | 0.70 | 0.002 | tr. | 0.035 | 0.0010 | 0.100 | tr. | 0.001 | tr. | 0.0021 | 0.0013 |
| 35 | 0.0017 | 3.80 | 0.65 | 0.010 | 0.0050 | 0.70 | 0.002 | tr. | 0.035 | 0.0036 | 0.100 | tr. | 0.001 | tr. | 0.0019 | 0.0014 |
| 36 | 0.0021 | 3.72 | 0.65 | 0.010 | 0.0150 | 0.71 | 0.002 | tr. | 0.035 | 0.0010 | 0.100 | tr. | 0.001 | tr. | 0.0014 | 0.0041 |
| 37 | 0.0025 | 3.75 | 0.65 | 0.010 | 0.0008 | 0.69 | 0.002 | tr. | 0.035 | 0.0010 | 0.100 | tr. | 0.001 | tr. | 0.0060 | 0.0023 |
| 38 | 0.0029 | 3.75 | 0.65 | 0.011 | 0.0008 | 0.72 | 0.002 | tr. | tr. | 0.0010 | 0.100 | tr. | 0.001 | tr. | 0.0012 | 0.0010 |
| 39 | 0.0030 | 3.71 | 0.80 | 0.013 | 0.0010 | 0.73 | 0.002 | 0.0020 | tr. | 0.0010 | 0.100 | 0.0020 | 0.001 | tr. | 0.0015 | 0.0011 |
| 40 | 0.0030 | 3.68 | 0.80 | 0.009 | 0.0011 | 0.74 | 0.002 | 0.0480 | tr. | 0.0010 | 0.100 | 0.0480 | 0.001 | tr. | 0.0016 | 0.0009 |
| 41 | 0.0010 | 3.73 | 0.79 | 0.008 | 0.0013 | 0.73 | 0.002 | tr. | 0.002 | 0.0010 | 0.100 | tr. | 0.001 | tr. | 0.0021 | 0.0010 |
| 42 | 0.0011 | 3.81 | 0.78 | 0.007 | 0.0011 | 0.68 | 0.002 | tr. | 0.049 | 0.0010 | 0.100 | tr. | 0.001 | tr. | 0.0022 | 0.0011 |
| 43 | 0.0025 | 3.84 | 0.80 | 0.011 | 0.0015 | 0.72 | 0.002 | 0.0020 | 0.030 | 0.0010 | 0.250 | 0.0020 | 0.001 | tr. | 0.0024 | 0.0012 |
| 44 | 0.0026 | 3.83 | 0.78 | 0.011 | 0.0014 | 0.72 | 0.002 | 0.0020 | 0.030 | 0.0010 | 0.490 | 0.0020 | 0.001 | tr. | 0.0025 | 0.0009 |
| 45 | 0.0020 | 3.75 | 0.79 | 0.009 | 0.0016 | 0.71 | 0.002 | tr. | 0.035 | 0.0010 | 2.510 | tr. | 0.001 | tr. | 0.0027 | 0.0011 |
| 46 | 0.0017 | 3.76 | 0.78 | 0.008 | 0.0015 | 0.71 | 0.002 | tr. | 0.035 | 0.0010 | 0.100 | tr. | 0.001 | 0.0018 | 0.0020 | 0.0011 |
| 47 | 0.0015 | 3.80 | 0.79 | 0.010 | 0.0016 | 0.71 | 0.002 | tr. | 0.035 | 0.0010 | 0.100 | tr. | 0.001 | 0.0046 | 0.0017 | 0.0012 |
| 48 | 0.0016 | 3.80 | 0.77 | 0.010 | 0.0008 | 0.71 | 0.002 | tr. | 0.035 | 0.0010 | 0.100 | tr. | 0.001 | tr. | 0.0013 | 0.0010 |
| 49 | 0.0017 | 3.75 | 0.60 | 0.010 | 0.0015 | 0.60 | tr. | tr. | 0.030 | 0.0020 | tr. | tr. | 0.001 | tr. | 0.0016 | 0.0015 |
| 50 | 0.0019 | 3.75 | 0.60 | 0.010 | 0.0015 | 0.60 | 0.002 | tr. | 0.030 | 0.0020 | tr. | tr. | 0.001 | tr. | 0.0014 | 0.0016 |
| 51 | 0.0019 | 3.75 | 0.61 | 0.010 | 0.0015 | 0.60 | 0.005 | tr. | 0.030 | 0.0020 | tr. | tr. | 0.001 | tr. | 0.0013 | 0.0018 |
| 52 | 0.0020 | 3.80 | 0.60 | 0.010 | 0.0015 | 0.60 | 0.009 | tr. | 0.030 | 0.0020 | tr. | tr. | 0.001 | tr. | 0.0012 | 0.0015 |
| 53 | 0.0022 | 3.75 | 0.62 | 0.010 | 0.0016 | 0.60 | 0.030 | tr. | 0.030 | 0.0020 | tr. | tr. | 0.001 | tr. | 0.0013 | 0.0014 |
| 54 | 0.0020 | 3.75 | 0.60 | 0.010 | 0.0017 | 0.60 | 0.060 | tr. | 0.030 | 0.0020 | tr. | tr. | 0.001 | tr. | 0.0014 | 0.0015 |
| 55 | 0.0020 | 3.75 | 0.60 | 0.010 | 0.0017 | 0.60 | 0.160 | tr. | 0.030 | 0.0020 | tr. | tr. | 0.001 | tr. | 0.0014 | 0.0016 |
| 56 | 0.0020 | 3.80 | 0.60 | 0.010 | 0.0015 | 0.60 | 0.002 | tr. | 0.030 | 0.0020 | 0.120 | tr. | 0.004 | tr. | 0.0012 | 0.0015 |
| 57 | 0.0020 | 3.80 | 0.60 | 0.010 | 0.0015 | 0.60 | 0.002 | tr. | 0.030 | 0.0020 | 0.120 | tr. | 0.007 | tr. | 0.0012 | 0.0016 |
| 58 | 0.0021 | 3.80 | 0.60 | 0.010 | 0.0015 | 0.60 | 0.002 | tr. | 0.030 | 0.0020 | 0.120 | tr. | 0.016 | tr. | 0.0013 | 0.0015 |
| 59 | 0.0022 | 3.75 | 0.62 | 0.010 | 0.0016 | 0.60 | 0.030 | tr. | 0.030 | 0.0020 | 0.010 | tr. | 0.001 | tr. | 0.0013 | 0.0042 |
| 60 | 0.0022 | 3.75 | 0.62 | 0.010 | 0.0016 | 0.60 | 0.030 | tr. | 0.030 | 0.0020 | 0.010 | tr. | 0.001 | tr. | 0.0013 | 0.0043 |
| 61 | 0.0022 | 3.95 | 0.30 | 0.010 | 0.0014 | 0.31 | 0.002 | tr. | 0.030 | 0.0020 | tr. | 0.080 | 0.001 | tr. | 0.0016 | 0.0008 |
| 62 | 0.0020 | 3.95 | 0.30 | 0.010 | 0.0015 | 0.31 | 0.002 | tr. | 0.030 | 0.0020 | tr. | 0.150 | 0.001 | tr. | 0.0015 | 0.0009 |
| 63 | 0.0021 | 3.95 | 0.30 | 0.010 | 0.0016 | 0.30 | 0.002 | tr. | 0.030 | 0.0020 | tr. | 0.300 | 0.001 | tr. | 0.0025 | 0.0010 |
| 64 | 0.0019 | 4.00 | 0.30 | 0.010 | 0.0013 | 0.10 | 0.002 | tr. | 0.030 | 0.0020 | tr. | tr. | 0.001 | tr. | 0.0020 | 0.0011 |
| 65 | 0.0018 | 4.00 | 0.30 | 0.010 | 0.0015 | 0.18 | 0.002 | tr. | 0.030 | 0.0020 | tr. | tr. | 0.001 | tr. | 0.0021 | 0.0015 |
| 66 | 0.0017 | 4.00 | 0.30 | 0.010 | 0.0017 | 0.28 | 0.002 | tr. | 0.030 | 0.0020 | tr. | tr. | 0.001 | tr. | 0.0023 | 0.0008 |

TABLE 4

| No. | RH reflux time (min) | Sheet thickness (mm) | Final annealing temperature (° C.) | Ratio of non-recrystallized parts (%) | Number of inclusions with size of 5 μm or more (count/mm$^2$) | Iron loss $W_{5/3k}$ (W/kg) | Magnetic flux density B50 (T) | Tensile strength TS (MPa) | Variation σ (MPa) | Fatigue strength (MPa) | Remarks |
|---|---|---|---|---|---|---|---|---|---|---|---|
| 30 | 15 | 0.25 | 680 | 29 | 3 | 99.8 | 1.59 | 846 | 15 | 592 | Ex |
| 31 | 15 | 0.25 | 700 | 29 | 3 | 95.3 | 1.46 | 921 | 15 | 520 | Com Ex |
| 32 | 15 | 0.25 | 660 | 32 | 3 | 100.0 | 1.60 | 854 | 15 | 598 | Ex |
| 33 | 15 | — | — | — | — | — | — | — | — | — | Com Ex. (crack occurred during cold rolling) |
| 34 | 20 | 0.25 | 660 | 30 | 2 | 107.0 | 1.60 | 861 | 14 | 603 | Ex |
| 35 | 20 | 0.25 | 660 | 30 | 2 | 108.6 | 1.60 | 861 | 22 | 590 | Com Ex |
| 36 | 22 | 0.25 | 660 | 31 | 5 | 135.6 | 1.57 | 853 | 16 | 530 | Com Ex |
| 37 | 22 | 0.25 | 660 | 30 | 3 | 121.8 | 1.58 | 855 | 15 | 560 | Com Ex |
| 38 | 22 | 0.25 | 660 | 30 | 1 | 106.2 | 1.59 | 857 | 15 | 600 | Ex |
| 39 | 22 | 0.25 | 660 | 28 | 1 | 105.0 | 1.61 | 855 | 15 | 599 | Ex |
| 40 | 22 | 0.25 | 660 | 27 | 1 | 104.6 | 1.63 | 852 | 15 | 597 | Ex |
| 41 | 22 | 0.25 | 660 | 30 | 1 | 105.0 | 1.61 | 857 | 16 | 600 | Ex |
| 42 | 22 | 0.25 | 660 | 29 | 1 | 104.3 | 1.62 | 863 | 15 | 604 | Ex |
| 43 | 22 | 0.25 | 660 | 28 | 1 | 104.2 | 1.60 | 870 | 16 | 609 | Ex |
| 44 | 22 | 0.25 | 660 | 28 | 1 | 101.3 | 1.58 | 874 | 16 | 612 | Ex |
| 45 | 22 | 0.25 | 660 | 25 | 1 | 99.7 | 1.56 | 904 | 15 | 633 | Ex |
| 46 | 22 | 0.25 | 660 | 32 | 1 | 104.3 | 1.62 | 859 | 14 | 601 | Ex |
| 47 | 22 | 0.25 | 660 | 35 | 1 | 103.2 | 1.62 | 863 | 15 | 604 | Ex |
| 48 | 22 | 0.20 | 660 | 30 | 1 | 90.3 | 1.62 | 863 | 16 | 604 | Ex. |
| 49 | 22 | 0.25 | 700 | — | 2 | 105.0 | 1.62 | 690 | 12 | 540 | Com Ex. |
| 50 | 23 | 0.25 | 700 | 15 | 2 | 105.0 | 1.60 | 840 | 15 | 600 | Ex. |
| 51 | 23 | 0.25 | 700 | 22 | 2 | 105.9 | 1.60 | 850 | 15 | 610 | Ex. |
| 52 | 23 | 0.25 | 700 | 30 | 2 | 106.3 | 1.60 | 855 | 15 | 615 | Ex. |
| 53 | 23 | 0.25 | 700 | 60 | 2 | 108.0 | 1.54 | 880 | 15 | 620 | Ex. |
| 54 | 23 | 0.25 | 700 | 60 | 2 | 112.0 | 1.50 | 880 | 15 | 620 | Ex. |
| 55 | 23 | 0.25 | 700 | 60 | 2 | 135.9 | 1.47 | 895 | 15 | 635 | Com Ex. |
| 56 | 22 | 0.25 | 680 | 15 | 2 | 113.2 | 1.58 | 845 | 15 | 602 | Ex. |
| 57 | 22 | 0.25 | 680 | 15 | 2 | 115.6 | 1.57 | 846 | 15 | 603 | Ex. |
| 58 | 22 | 0.25 | 680 | 15 | 2 | 136.1 | 1.48 | 850 | 15 | 610 | Com Ex. |
| 59 | 12 | 0.25 | 650 | 70 | 4 | 118.0 | 1.54 | 860 | 15 | 630 | Ex. |
| 60 | 12 | 0.25 | 610 | 80 | 4 | 130.0 | 1.53 | 870 | 16 | 630 | Com Ex. |
| 61 | 23 | 0.25 | 700 | 15 | 2 | 115.0 | 1.60 | 825 | 15 | 595 | Ex. |
| 62 | 23 | 0.25 | 700 | 15 | 2 | 115.0 | 1.58 | 825 | 15 | 595 | Ex. |
| 63 | 23 | 0.25 | 700 | 15 | 2 | 116.0 | 1.50 | 823 | 15 | 591 | Ex. |
| 64 | 23 | 0.25 | 700 | 15 | 2 | 120.0 | 1.59 | 826 | 16 | 592 | Ex. |
| 65 | 23 | 0.25 | 700 | 15 | 2 | 119.5 | 1.59 | 824 | 16 | 591 | Ex. |
| 66 | 23 | 0.25 | 700 | 15 | 2 | 116.0 | 1.60 | 824 | 15 | 591 | Ex. |

The invention claimed is:

1. A non-oriented electrical steel sheet comprising:
a steel sheet chemical composition containing, in mass %,
C: 0% or more and 0.0100% or less,
P: 0% or more and 0.100% or less,
Si: 2.00% or more and 5.00% or less,
Mn: 0% or more and 5.00% or less,
Al: 0.1% or more and 3.00% or less,
S: 0% or more and 0.0100% or less,
N: 0% or more and 0.0050% or less,
Zn: 0.0005% or more and 0.0030% or less,
Mo: 0.001% or more and 0.100% or less,
Cu: 0% or more and 0.2% or less,
Nb: 0% or more and 0.010% or less, and
O: 0% or more and 0.0050% or less, with the balance being Fe and inevitable impurities; and
a microstructure in which a ratio of non-recrystallized microstructure is 5% or more and 70% or less, and the number of inclusion having a diameter of 5 μm or more is not more than 5 counts/mm$^2$.

2. The non-oriented electrical steel sheet according to claim 1, further comprising Cr: 0.010 mass % or more and 5.000 mass % or less as the steel sheet chemical composition.

3. The non-oriented electrical steel sheet according to claim 2, further comprising Ca: 0.0010 mass % or more and 0.0050 mass % or less as the steel sheet chemical composition.

4. The non-oriented electrical steel sheet according to claim 3, further comprising Sn: 0.001 mass % or more and 0.100 mass % or less and/or Sb: 0.0010 mass % or more and 0.1000 mass % or less as the steel sheet chemical composition.

5. The non-oriented electrical steel sheet according to claim 2, further comprising Sn: 0.001 mass % or more and 0.100 mass % or less and/or Sb: 0.0010 mass % or more and 0.1000 mass % or less as the steel sheet chemical composition.

6. The non-oriented electrical steel sheet according to claim 1, further comprising Ca: 0.0010 mass % or more and 0.0050 mass % or less as the steel sheet chemical composition.

7. The non-oriented electrical steel sheet according to claim 6, further comprising Sn: 0.001 mass % or more and 0.100 mass % or less and/or Sb: 0.0010 mass % or more and 0.1000 mass % or less as the steel sheet chemical composition.

8. The non-oriented electrical steel sheet according to claim 1, further comprising Sn: 0.001 mass % or more and 0.100 mass % or less and/or Sb: 0.0010 mass % or more and 0.1000 mass % or less as the steel sheet chemical composition.

9. A method for manufacturing the non-oriented electrical steel sheet according to claim 1, comprising feeding a deoxidizer during vacuum degassing and then perform stirring for 10 minutes or more.

10. A method for manufacturing the non-oriented electrical steel sheet according to claim 2, comprising feeding a deoxidizer during vacuum degassing and then perform stirring for 10 minutes or more.

11. A method for manufacturing the non-oriented electrical steel sheet according to claim 3, comprising feeding a deoxidizer during vacuum degassing and then perform stirring for 10 minutes or more.

12. A method for manufacturing the non-oriented electrical steel sheet according to claim 4, comprising feeding a deoxidizer during vacuum degassing and then perform stirring for 10 minutes or more.

13. A method for manufacturing the non-oriented electrical steel sheet according to claim 5, comprising feeding a deoxidizer during vacuum degassing and then perform stirring for 10 minutes or more.

14. A method for manufacturing the non-oriented electrical steel sheet according to claim 6, comprising feeding a deoxidizer during vacuum degassing and then perform stirring for 10 minutes or more.

15. A method for manufacturing the non-oriented electrical steel sheet according to claim 7, comprising feeding a deoxidizer during vacuum degassing and then perform stirring for 10 minutes or more.

16. A method for manufacturing the non-oriented electrical steel sheet according to claim 8, comprising feeding a deoxidizer during vacuum degassing and then perform stirring for 10 minutes or more.

* * * * *